United States Patent

[11] 3,564,337

| | | | |
|---|---|---|---|
| [72] | Inventor | William D. Macgeorge<br>Doylestown, Pa. | |
| [21] | Appl. No. | 783,913 | |
| [22] | Filed | Dec. 16, 1968 | |
| [45] | Patented | Feb. 16, 1971 | |
| [73] | Assignee | Thwing-Albert Instrument Company<br>Philadelphia, Pa. | |

[54] MOTOR OVERLOAD CONTROL CIRCUIT FOR MATERIAL TESTING MACHINE
8 Claims, 4 Drawing Figs.

[52] U.S. Cl.................................................. 317/13,
317/33, 318/434, 318/327, 73/88.5, 318/488
[51] Int. Cl.................................................. H02h 7/06;
H02p 5/06
[50] Field of Search........................................ 318/432,
434, 345, 328, 327, 341, 488; 73/88.5; 307/119,
130, 131; 317/13

[56] References Cited
UNITED STATES PATENTS

| | | | |
|---|---|---|---|
| 3,251,483 | 5/1966 | Devol............................ | 318/488 |
| 3,465,227 | 9/1969 | Ivie et al........................ | 318/434 |

Primary Examiner—Oris L. Rader
Assistant Examiner—Robert J. Hickey
Attorney—Zachary T. Wobensmith, 2ND ABSTRACT: There is provided a system which is used to control the operation of a material testing machine. The system includes a circuit which controls the speed of the motor that operates the testing machine and a control circuit which produces a control signal in response to an abnormal load condition whereby the motor can be turned off.

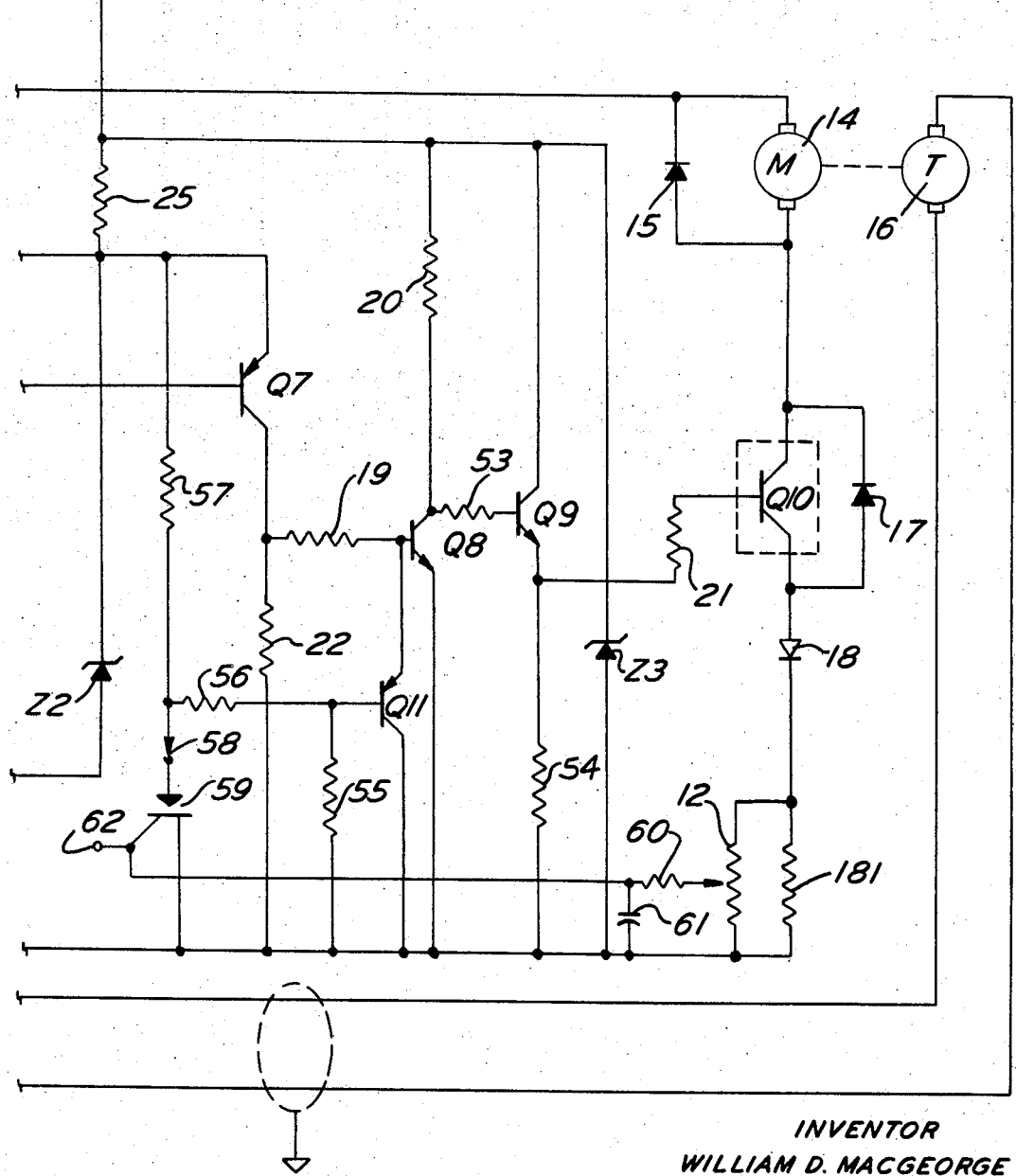

INVENTOR
WILLIAM D. MACGEORGE

ATTORNEY

MOTOR OVERLOAD CONTROL CIRCUIT FOR MATERIAL TESTING MACHINE

BACKGROUND OF THE INVENTION

1. Field of the Invention

The invention relates to a control system, and more particularly to a system for controlling the rotation of an electric motor over a wide range of speeds.

There are many examples of applications of electric motors wherein wide ranges of accurate speed control are required. One such example, is a testing machine, e.g. a material strength testing machine, wherein different rates of motor speed are desirable for different materials and for different types of tests. Moreover, in tensile strength or other strength of materials testing machines, it is possible to overload, and thus, damage a sensitive load cell. Likewise, it is possible to reverse the load cell and destroy it. In one application, the motor may require controls capable of regulating its speed between very low and very high rates such as 1 to 3000 r.p.m. for normal operation. Of course, the motor speed is related to the operation of the testing machine and the range of speeds is not limitative. Additionally, an electronic circuit breaker circuit can be used to turn off the motor to prevent destruction of the load cell or the like.

2. Description of the Prior Art

Various motor control systems have heretofore been proposed but these have had shortcomings, particularly as to the tendency to transistor failures and the lack of adequate protection of the load cell against abnormal load conditions.

SUMMARY OF THE INVENTION

The present invention provides a control system which includes a circuit for controlling electric motor speed within limits such as those noted above. In this circuit a predetermined voltage value, or potential, is summed with a signal voltage produced by a tachometer. The tachometer is mechanically coupled to the motor which is to be controlled so that the voltage signal produced by the tachometer is related to the motor speed. The voltage sum is operated upon and combined with a variable voltage produced by a suitable signal generator. The voltage combination which is achieved by suitable means, produces a signal indicative of the relationship between the combination of set point potential (i.e. predetermined potential) and the variable potential (i.e. tachometer output) versus the voltage produced by the signal generator. The signal ultimately produced by the combining means exhibits either a minimum or maximum value- not an intermediate value. The content of the signal, if any, produced by the combined or superimposed signal of the signal generator voltage and the aforesaid sum voltage is reflected in the duration of the signal produced. This signal is applied, through suitable semiconductor amplifying and switching means, to the controlled motor. The motor is operated so long as a drive signal is applied thereto. Thus, control of the motor is effected.

In addition, an electronic circuit breaker network prevents overload of the motor. In this circuit, a load cell is applied to the sample under test. The load cell is connected to produce a signal as a function of the operation thereof in accordance with the conditions of the sample. This signal may be supplied to a digital display or a recorder. The signal produced by the load cell is also supplied to an amplifier which has a preset signal gain and is designed to avoid loading the indicating circuit. Whenever the load cell output exceeds a preset value (representative of either tension or compression), the amplifier produces a signal which turns off the motor driving the testing machine.

The control circuit produces the typical advantages of transistorized circuitry. In particular, through the use of the selectively switched operation, the transistors are operated only at full power (or zero power) for predetermined times rather than being continuously operated at less than full power. This circuit uses square wave signals rather than triangular or the like signals. The indicated manner of operation of this circuit utilizes the known characteristic of transistors wherein less heat is developed at full power operation than at intermediate power operation. This operation reduces transistor "burnouts" and thermal failures.

Therefore, this invention is intended to provide a motor control system which utilizes transistorized circuits and the advantages thereof. Transistorized circuitry is made feasible through the use of selected duration, full power operation.

Thus, one object of this invention is to provide a control circuit.

Another object of this invention if to provide a control circuit which supplies signals to a motor which is being controlled.

Another object of this invention is to provide a control system which utilizes a technique which is akin to pulse modulation wherein intermediate level operation is provided without intermediate power levels being utilized.

Another object of this invention is to provide a control circuit having builtin electronic overload protection means.

Another object of this invention is to provide a control circuit wherein the electronic overload protection means produces a control signal when a predetermined condition exists at the test point.

These and other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIGS. 1A, 1B, 1C combined is a schematic diagram of a preferred embodiment of the overall control system.

DESCRIPTION OF THE PREFERRED EMBODIMENT

Figure 1A:
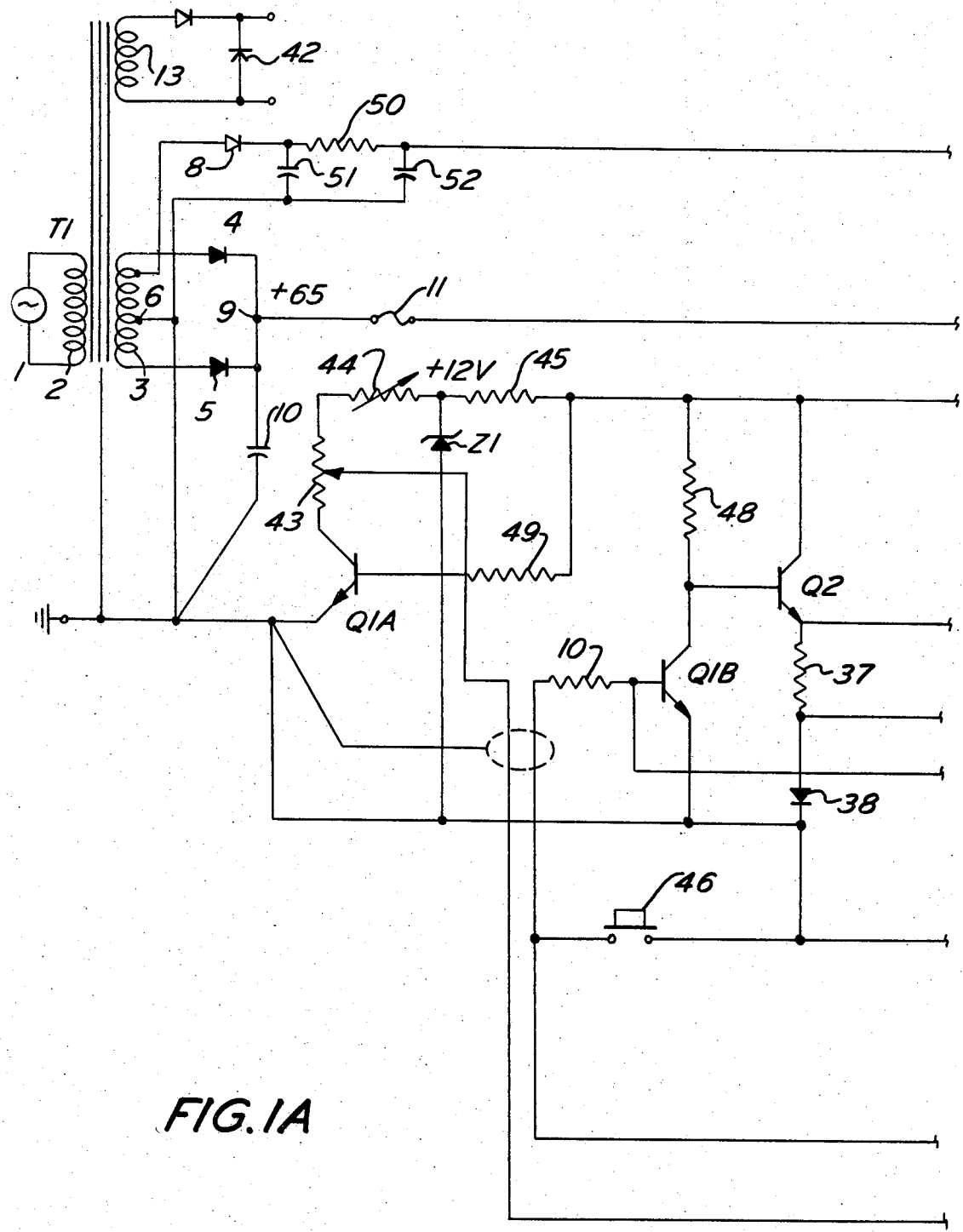
Figure 1B:
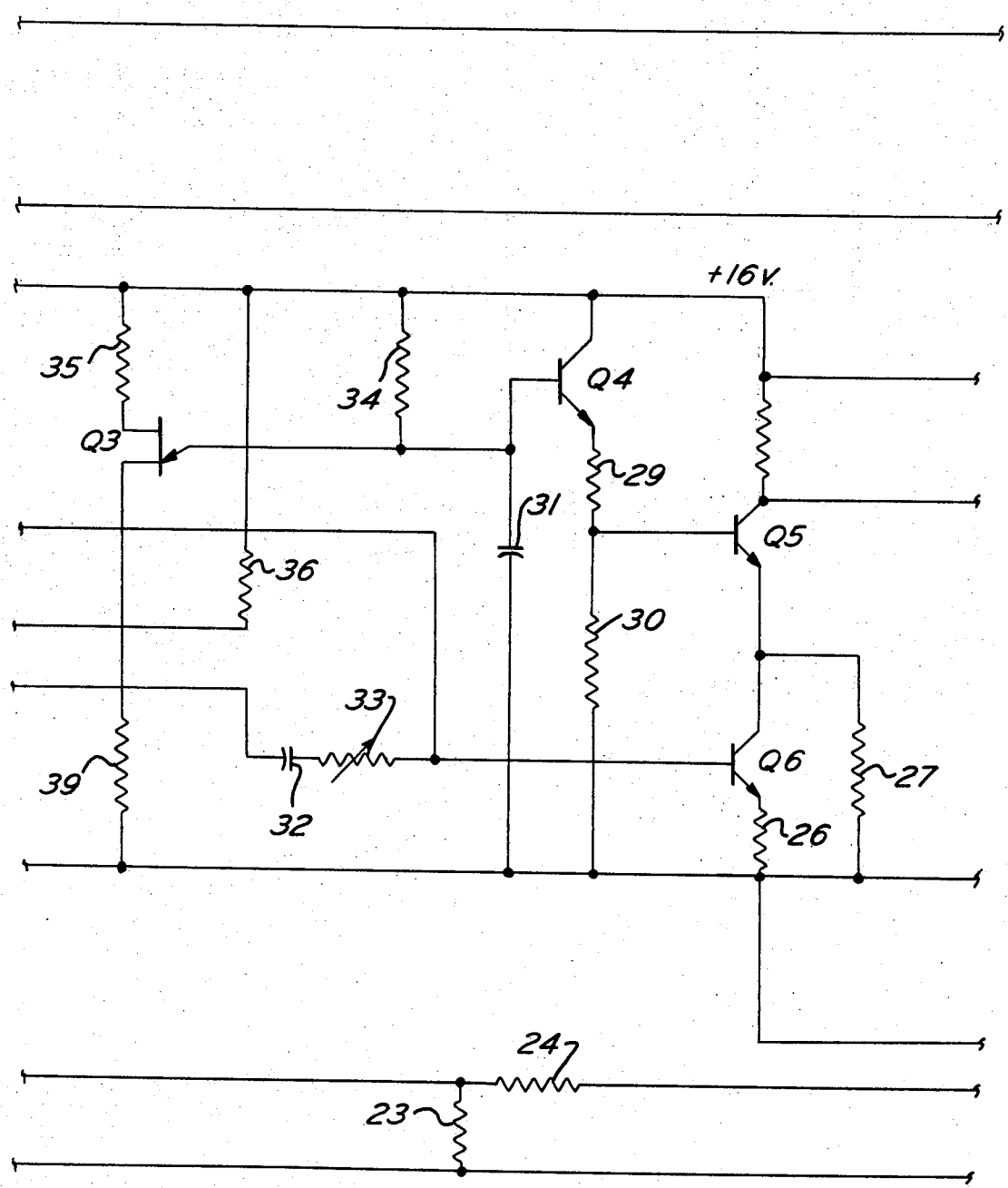

Referring now to FIGS. 1A, 1B, 1C a suitable source 1 is connected to a primary winding 2 of transformer T1. Although not shown, a fuse and switch network may be incorporated in series with source 1. Secondary winding 3 of transformer T1 is connected at the opposite end terminals thereof to the anodes of diodes 4 and 5, respectively. The cathodes of diodes 4 and 5 are connected to common junction 9. The center tap 6 of winding 3 is connected to a reference potential, for example ground. This ground connection is common throughout the circuit, thus reducing the possibility of spurious signals being produced. Capacitor 10 is connected between ground and common junction 9. This circuitry provides a power supply wherein a substantially constant DC potential of approximately +65 volts is provided at junction 9.

Another tap of secondary winding 3 is connected to the anode of diode 8. The cathode of diode 8 is connected to the junction of series connected resistor 50 and capacitor 51. Capacitor 51 is returned to ground, for example at tap 6 of winding 3. Capacitor 52 is connected between tap 6 and the other terminal of resistor 50. This circuit provides a substantially constant potential of approximately +22 volts at the junction of resistor 50 and capacitor 52.

One terminal of secondary winding 13 of transformer T1 is connected to the anode of diode 41. The cathode of diode 41 is connected to an output terminal and to one side of capacitor 42. The other side of capacitor 42 is connected to another terminal of winding 13 and another output terminal to provide a substantially unidirectional signal.

Common junction 9 is connected via fuse 11 to one control terminal of motor 14. Motor 14 is the motor which is to be controlled. The second control terminal of motor 14 is connected to the anode of diode 15. The cathode of diode 15 is returned to the first mentioned terminal of motor 14. This connection of diode 15 selectively bypasses motor 14 and provides protection therefor.

The second terminal of motor 14 is connected to the collector electrode of NPN transistor Q10. The emitter electrode of transistor Q10 is connected to ground via the parallel combination of resistor 18 and variable resistor 12. Temperature compensation diode 17 is connected between the emitter and collector electrodes of transistor Q10. The anode and cathode of diode 17 are connected to the emitter and collector, respectively, of transistor Q10. The base electrode of transistor Q10 is connected to the collector electrode of transistor Q9 via resistor 21.

The anode of Zener diode Z3 is connected to ground. The cathode of Zener diode Z3 is connected to the +22 volt junction at resistor 50. The Zener diode is effective to provide a substantially constant voltage drop of approximately 22 volts thereacross. Thus, the potential at the cathode of Zener diode Z3 is maintained quite close to +22 volts.

Variable resistor 43 is used to provide a set point control signal. One end terminal of resistor 43 is connected to the collector of transistor Q1A. The emitter of transistor Q1A is connected to ground. The base of transistor Q1A is connected to a +12 volt source via resistor 49. The other end terminal of resistor 43 is connected to a variable resistor 44 which is utilized for calibrating the system. Connected in parallel with the aforesaid network is Zener diode Z1. That is, the anode of Zener diode Z1 is connected to ground while the cathode thereof is connected to a further end terminal of calibrating resistor 44. Diode Z1 is of the type which provides a substantially constant potential drop thereacross of about 8 volts. Thus, the potential at the cathode of diode Z1 is approximately +8 volts.

Tachometer 16 which is mechanically coupled to motor 14 has the opposite terminals thereof connected to end terminals of resistors 23 and 24, respectively. Resistors 23 and 24 are joined together at a common point thereby providing a voltage divider network across the tachometer. One end of resistor 23 (which is connected to one terminal of tachometer (16) is connected to the variable tap or wiper arm of variable resistor 43. The common junction between resistors 23 and 24 is connected, via resistor 40, to the base of transistor Q1B which is matched to transistor Q1A. Resistor 40 is connected to additional circuitry as will appear hereinafter. The connection between the tachometer and the other circuitry is effected by twisted shielded cable wherein the shield may be grounded to avoid pickups of undesirable signals.

Isolating resistor 45 is connected between the +8 volt terminal of Zener diode Z1 and a +12 volt terminal which is connected to the cathode of Zener diode Z2. This terminal is also connected to resistor 49 at the base of transistor Q1A. The anode of Zener diode Z2 is connected to ground. The +12 volt terminal at the cathode of Zener diode Z2 is connected to the +22 volt terminal at the cathode of Zener diode Z3 via isolating resistor 25.

Resistor 48 is connected between the +12 volt terminal and the collector electrode of NPN transistor Q1B. The emitter electrode of transistor Q1B is connected to ground. The base electrode of transistor Q1B is connected to resistor 40 as noted supra. The collector electrode of transistor Q1B is further connected to the base of emitter-follower transistor Q2. The collector of transistor Q2 is connected to the +12 volt terminal. The emitter electrode of transistor Q2 is connected to ground via the series network of resistor 37 and diode 38. Diode 38 is poled for conduction from the transistor to ground and provides a voltage dropping function. The junction between resistor 37 and diode 38 is connected via resistor 36 to the +12 volt terminal.

A unijunction transistor Q3 (sometimes referred to as a double base diode) has the bases thereof connected, respectively, to resistors 35 and 39 which are further connected to the +12 volt and ground terminals, respectively. The emitter electrode of transistor Q3 is connected to the +12 volt terminal via resistor 34. In addition, the emitter electrode of transistor Q3 is connected to ground via storage capacitor 31. The common junction of the emitter of transistor Q3, one terminal of resistor 34 and one terminal of capacitor 31 is connected to the base of NPN transistor Q4. The collector electrode of transistor Q4 is connected to the +12 volt terminal. Transistor Q3 provides a selective discharge network for capacitor 31. Transistor Q4 provides a ramp function controlled by the selective charging and discharging of capacitor 31.

The emitter of transistor Q4 is connected to ground via the series connected resistors 29 and 30. The junction between resistors 29 and 30 is connected to the base of NPN transistor Q5. The collector electrode of transistor Q5 is connected via resistor 28 to the +12 volt terminal. The emitter of transistor Q5 is connected to the collector of transistor Q6. The emitter of NPN transistor Q6 is connected via resistor 26 to ground. The collector of transistor Q6 is connected to ground via resistor 27. Transistor Q6 provides a "pedestal" or reference potential which is superimposed upon the ramp voltage supplied to transistor Q5. The base electrode of transistor Q6 is connected directly to the emitter electrode of transistor Q2. In addition, the base of transistor Q6 is connected via variable resistor 33 and capacitor 32, to the base of transistor Q1B. Resistor 33 permits a selective operation and setting whereby the stability of the system is controlled. The stability is effected inasmuch as resistor 33 and capacitor 32 provide a negative feedback path from transistor Q2 to transistor Q1B.

The collector electrode of transistor Q5 is connected to the base electrode of PNP transistor Q7. The emitter electrode of transistor Q7 is connected to the +12 volt terminal at the cathode of Zener diode Z2. The collector electrode of transistor Q7 is connected via resistor 22 to ground. In addition, the collector electrode of transistor Q7 is connected via resistor 19 to the base of NPN transistor Q8. The emitter of transistor Q8 is connected directly to ground. The collector electrode of transistor Q8 is connected to the +22 volt terminal at the cathode of Zener diode Z3, via resistor 20. In addition, the collector electrode of transistor Q8 is connected to the base of NPN transistor Q9 via resistor 53. The emitter electrode of transistor Q9 is connected to ground via resistor 54. The collector electrode of transistor Q9 is connected to the base of NPN transistor Q10 via resistor 21 as noted above.

The emitter of PNP transistor Q11 is connected to the base of transistor Q9. The collector of transistor Q11 is connected directly to ground. The base of transistor Q11 is also connected to ground via resistor 55. In addition, the base of transistor Q11 is connected to the emitter of transistor Q7 via series connected resistors 56 and 57. The junction of resistors 56 and 57 is connected to one terminal of reset switch 58. The other terminal of switch 58 is connected to the anode of silicon controlled switch (SCS) 59. The cathode of SCS 59 is connected to ground. The gate electrode of SCS 59 is connected via resistor 60 to the tap of variable resistor 12 noted above. Capacitor 61 is connected between the gate electrode of SCS 59 and ground.

In the event that an external control of the reset circuit is required or desired, such control is connected to external terminal 62. A typical external control circuit is shown and described in FIG. 2.

Switch 46 is selectively connected between the junction of resistors 23 and 24 and the ground terminal. This connection is made during motor stop or reversal periods and provides smoother operation.

In operation, unijunction transistor Q3 has the emitter thereof connected to capacitor 31. As is well known in the art, unijunction transistor Q3 is normally nonconductive. However, as capacitor 31 is charged via resistor 34, the potential at the emitter electrode of transistor Q3 tends to rise. When the critical or threshold value is reached, transistor Q3 "fires" and is conductive. The charge stored in capacitor 31 is drained off through transistor Q3 and resistor 39. The time constant for this network is relatively small so that capacitor 31 is substantially discharged.

The base of transistor Q4 is also connected to capacitor 31 and the potential thereat varies accordingly. Thus, the base of NPN transistor Q4 exhibits an increasingly positive potential.

As the potential at the base thereof becomes more positive, transistor Q4 turns on and conducts more current therethrough. As more current is supplied to the series network of resistors 29 and 30, the voltage drop across each of the resistors increases. Specifically, the voltage drop across resistor 30 increases, whereby the potential at the base of transistor Q5 increases. Operation of transistor Q5 tends to be similar to the operation of transistor Q4. However, transistor Q6, in series with transistor Q5, provides a pedestal or reference potential thereto. The reference potential supplied by transistor Q6 and across resistor 27 controls the level at which transistor Q5 turns on. That is, by controlling the potential at the emitter electrode of transistor Q5, the potential at the base thereof which will cause transistor Q5 to be rendered conductive is controllably determined.

When transistor Q5 becomes conductive, the signal at the collector electrode thereof exhibits a lower level than in the nonconductive state. This lower potential is supplied to the base of transistor Q7. Since transistor Q7 is a PNP-type transistor, the application of a signal to the base thereof which is negative relative to the potential at the emitter causes conduction through the transistor.

As will be seen, transistors Q8, Q9 and Q10 follow in cascaded arrangement. Each of these transistors is controlled by the preceeding one in the chain. For example, when transistor Q7 is turned on, a relatively positive potential is supplied at the base of NPN transistor Q8 wherein transistor Q8 is turned on. Transistor Q8 supplies a relatively negative potential at the base of PNP transistor Q9 whereby transistor Q9 is turned on. When transistor Q9 is turned on, a relatively positive potential is supplied to the base electrode of transistor Q10 whereby this transistor is turned on. When transistor Q10 is turned on, current flows therethrough, as well as through the serially connected motor 14 and resistors 18 and 12. Consequently, motor 14 is driven in accordance with the duration of the conduction of transistor Q10. The conductive condition of transistor Q10 is controlled by the duration of the positive signals applied to the base thereof. The duration of the signals applied to the base of transistor Q10 is, ultimately, controlled by the signal supplied by ramp amplifier transistor Q5. The duration of the signal supplied by transistor Q5 is a function of the reference potential which is supplied thereto by transistor Q6.

When motor 14 is driven by the application of current thereto via transistor Q10, tachometer 16 is driven also. As tachometer 16 is driven, the output signal provided thereby is applied across the voltage divider network comprising resistors 23 and 24. As noted, the set point control voltage provided by resistor 43 is superimposed upon the output signal provided by tachometer 16. The voltage divider network is utilized to provide impedance matching between the various components.

Transistor Q1A is always conductive due to the potentials supplied thereto. Therefore, current exists in the circuit branch comprising calibration resistor 44, set point control resistor 43 and the emitter-collector junction of transistor Q1A. Transistor Q1A is matched with transistor Q1B in order to provide inherent temperature compensation along with equalization of circuit parameters relative to the circuit branch including transistor Q1B.

The signal supplied to the base of transistor Q1B is a function of the sum of the signals supplied by tachometer 16 and the set point control resistor 43. When the signal supplied via resistor 40 to the base of transistor Q1B is sufficiently positive, transistor Q1B is turned on. The signal supplied via resistor 40 is, of course, the tachometer output signal superimposed upon the set point signal. When transistor Q1B is turned on, transistor Q2 is turned off. As noted, the output signal from the emitter of transistor Q2 is applied to the base of reference or pedestal potential transistor Q6. The signal supplied at the emitter of transistor Q2 is fed back to the base of transistor Q6 via the stability network (or negative feedback circuit) comprising capacitor 32 and resistor 33. This permits high gain circuitry for wide speed-range regulation but limits hunting by the system.

The connections between transistor Q6 and transistor Q5 operate to provide a control dependent upon the pedestal or reference potential which is supplied to transistor Q5. Moreover, the signal produced by transistor Q5 tends to have a more nearly squarewave shape of a duration controlled by the pedestal voltage. That is, the higher the pedestal voltage, the greater the magnitude required of the ramp signal to turn on transistor Q5. The greater the ramp magnitude, the longer the duration thereof, the longer transistor Q5 remains off, the longer the high level signal is applied to the base of transistor Q7 thereby holding transistor Q7 turned off. As noted, the signal supplied by transistor Q5 is supplied to transistor Q7 to, ultimately, control the conductivity of the transistor Q10 which controls the operation of motor 14.

Shutdown circuits are provided at SCS 59 and at reset switch 58. Typically, switch 58 is in the closed position, as shown, to supply a positive potential to the anode of SCS 59. If SCS 58 fires, as described hereinafter, reset switch 58 is utilized to disconnect and deactivate SCS 59 and to reactivate the circuit.

Transistor Q11 is normally nonconductive inasmuch as the potential supplied to the base thereof is positive relative to the potential at the emitter thereof. Transistor Q11 has no effect on the circuit in this condition.

However, if an overload or excessive current exists in the motor 14 circuit, a relatively large voltage drop occurs across resistors 12 and 181, respectively. This voltage produces current through resistor 60 and causes capacitor 61 to charge. When capacitor 61 charges to a predetermined level, a signal is supplied to the gate electrode of SCS 59. This signal causes SCS 59 to fire. When SCS 59 fires, the base of transistor Q11 has a relatively negative potential supplied thereto and becomes conductive. When transistor Q11 is conductive, the base of transistor Q8 is effectively clamped to ground and transistor Q8 is nonconductive. Thus, transistors Q9 and Q10 are also rendered nonconductive and motor 14 cannot be activated. Therefore, an electrical circuit breaker is effected whereby motor 14 is protected from serious overloads.

As noted, an external control circuit can be utilized to fire SCS 59. The external control circuit would provide a signal, for example +0.5 volt, to terminal 62 to cause SCS 59 to fire. A suitable external control circuit is described relative to FIG. 2.

Figure 2:
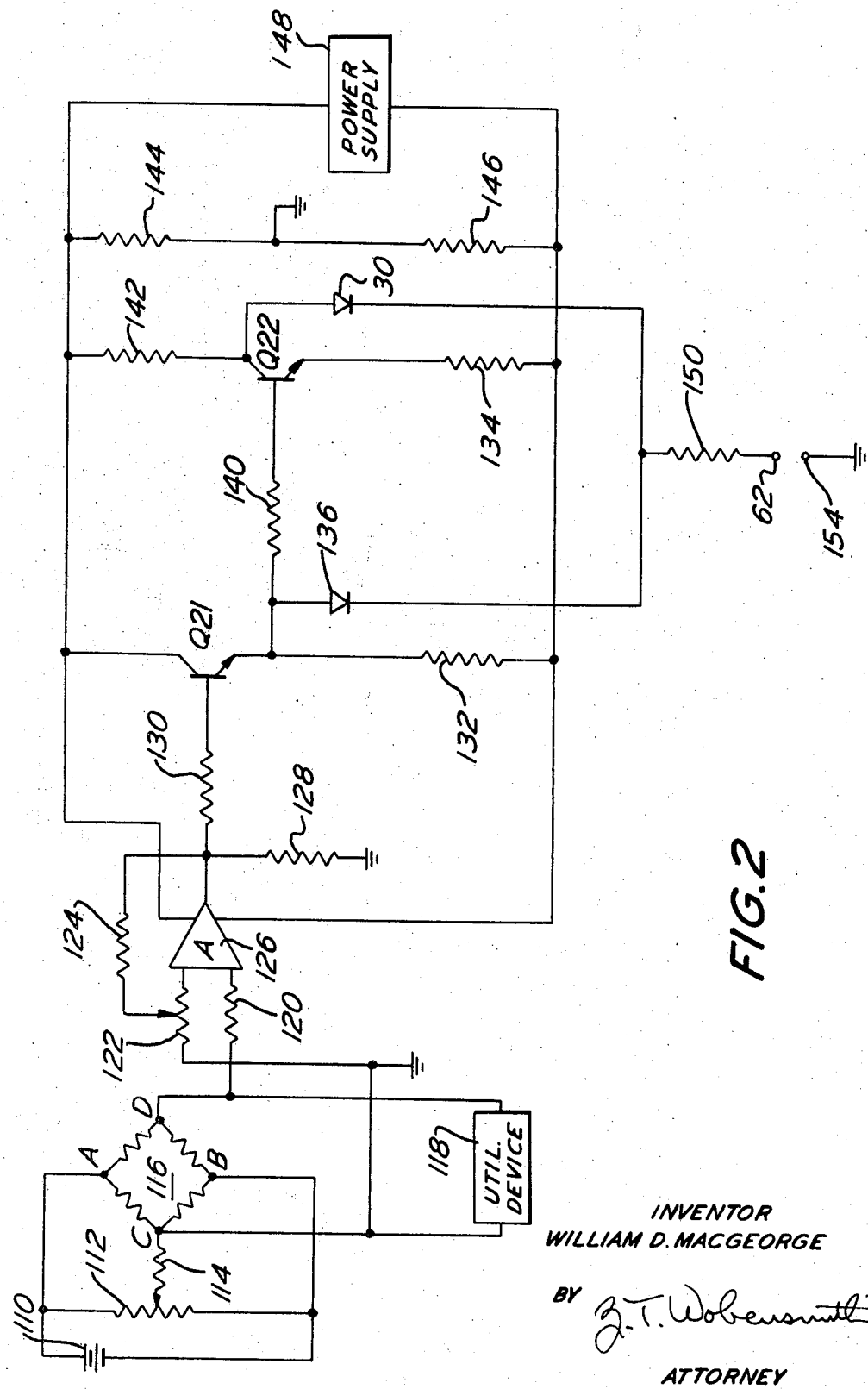
FIG. 2 is a schematic diagram of a preferred embodiment of the electronic overload protection circuit means.

Referring now to the schematic diagram shown in FIG. 2, there is shown a suitable external control circuit for use with the system. A typical load cell 116, shown schematically as a resistance bridge, has a pair of opposing nodes (A and B) connected across a power source represented by battery 110. Variable resistor 112 is connected in parallel with battery 110, such that a suitable reference or zeroing potential may be supplied via resistor 114 to node C of the remaining pair of nodes (C and D). This latter mentioned pair of nodes is connected to a utility device 118 which may be a recorder or the like for recording the signal generated across load cell 116. In addition, the last mentioned pair of nodes is so connected that node C is connected to ground and D is connected, via resistor 120, to one input of amplifiers 126.

Another input of amplifier 126 is connected to ground via variable resistor 122. The variable tap of resistor 122 is connected via feedback resistor 124 to the output of amplifier 126. The output of amplifier 126 is further connected via load resistor 128 to ground.

In addition, the output of amplifier 126 is connected via resistor 130 to the base of transistor Q21 which may be an NPN transistor. The collector of transistor Q21 is connected directly to one terminal of power supply 148 which may be any suitable power supply capable of supplying a substantially constant, positive DC signal to the collector of transistor Q21. The emitter of transistor Q21 is connected via resistor 132 to another terminal of power supply 148 in order to receive a substantially constant, negative DC signal.

The emitter of transistor Q21 is further connected via resistor 140 to the base of transistor Q22 which may also be an NPN transistor. The collector of transistor Q22 is connected via resistor 142 to the first or positive terminal of power supply 148. The emitter of transistor Q22 is connected via resistor 134 to the second or negative terminal of power supply 148. Resistors 144 and 146 are connected in series with each other and across power supply 148. The junction of resistors 144 and 146 is connected to ground or other suitable reference supply voltage. In addition amplifier 126 may be connected across power supply 148 to receive energy therefrom.

The emitters of transistors Q21 and Q22 are connected to the anodes of diodes 136 and 138, respectively. The cathodes of diodes 136 and 138 are connected together and to output terminal 62 via resistor 150. Output terminal 152 is referenced to output terminal 54 which is connected to ground or other suitable reference potential. It will be noted that terminal 62, in FIG. 1C, is the control terminal of SCS 59.

In operation, battery 110 is connected to load cell 116 to provide a signal to opposed nodes A and B thereof. Variable resistor 112 is adjusted to supply a suitable signal to load cell 116 in order to provide a system zero signal. In addition, resistor 122 is suitably adjusted to control the feedback gain of amplifier 126.

When the system is operating, load cell 116 produces a signal thereacross as a function of the deformation of the sample. This signal is produced across the opposed terminals or nodes C and D thereof. The signal produced by the load cell is applied via resistor 120 to the noninverting input of amplifier 126.

Amplifier 126 operates upon the input signal supplied thereto which may be on the order of a millivolt DC input and supplies a signal via resistor 130 to the base of transistor Q21.

It is assumed initially that the signal supplied to the base of transistor Q21 is sufficiently negative with respect to the signal applied to the emitter thereof, such that transistor Q21 is rendered nonconductive. If the transistor Q21 is nonconductive, the potential at the emitter thereof and supplied to the anode of diode 136 is relatively negative. Thus, diode 136 is reverse biased and nonconductive. However, the relatively negative potential is also supplied to the base of transistor 022 such that transistor Q22 is also nonconductive. When transistor Q22 is nonconductive, the potential at the collector thereof is relatively positive and is applied to the anode of diode 130. Thus, diode 130 is rendered forward biased and provides a signal via resistor 150 to output terminal 62. The signal supplied to output terminal 62 is, with respect to output terminal 154, relatively positive.

Referring again to the base of transistor Q21, it is assumed that a relatively positive potential signal is provided. This relatively positive signal, with respect to the emitter potential renders transistor Q21 conductive. The potential at the emitter of transistor Q21 becomes substantially equal to the positive potential at the base thereof (less forward junction voltage drop). This signal is applied to the anode of diode 136 and forward biases diode 136 whereby conduction therethrough is achieved. The positive signal supplied via diode 136 is applied to output terminal 62 via resistor 150. In addition, the positive signal at the emitter of transistor Q21 is applied to the base of transistor Q22. This positive signal renders transistor Q22 conductive whereby the potential at the collector thereof becomes relatively negative, or only slightly positive wherein diode 130 is either nonconductive or only slightly forward conductive. The signal, if any, transmitted through diode 130 is summed with the signal transmitted through diode 136 and applied to output terminal 62 via resistor 150. Again, the signal supplied to output terminal 62 is relatively positive with respect to output terminal 154. Thus, it is seen that a positive potential output signal is supplied regardless of whether the input signal is positive or negative.

Thus, it is seen that a relatively uncomplicated system is provided wherein accurate control of a motor drive is obtained. This accurate control uses transistorized circuitry which is full-on or full-off with only the duration of the respective pulses being variable. This type of operation prolongs the effective life of the semiconductors. Moreover, an automatic overload protection network is provided. The load limit cutoff circuit is highly useful and desirable in an automatic system. For example, in the tensile testing equipment field, the limit circuit can be utilized to detect an overload at the load cell and provide a signal at the output terminals which signal is of the proper polarity to effect a switching operation which will properly affect (e.g. turn off) the machine operation.

In the preferred embodiment, which has been described, the suggested specific elements are not meant to be limitative of the invention. Rather, those skilled in the art may conceive modifications and variations thereof. However, so long as these modifications and variations are equivalent to the subject circuit, they are intended to be included in the description.

I claim:

1. A control system comprising:
   signal generating means,
   amplifier means connected to said signal generating means,
   means for supplying a variable reference potential, said last named means connected to said amplifier means such that the operation of said amplifier means is determined as a function of the relative magnitudes of the signal supplied by said signal generating means and the potential supplied by said reference potential supplying means,
   output means controlled by said amplifier means,
   overload protection means for selectively inactivating said amplifier means when said output means approaches overload conditions,
   common reference means connected to each of the enumerated means to prevent spurious signals from being detected,
   said overload protection means including a silicon controlled switch,
   energy storage means,
   said silicon controlled switch being connected to said energy storage means and operative to be triggered when said energy storage means stores a predetermined energy magnitude, and
   said energy storage means being connected to said output means to store energy as a function of the current in said output means.

2. A control system comprising:
   a signal generating means,
   amplifier means connected to said signal generating means,
   means for supplying a variable reference potential, said last named means connected to said amplifier means such that the operation of said amplifier means is determined as a function of the relative magnitudes of the signal supplied by said signal generating means and the potential supplied by said reference potential supplying means,
   output means controlled by said amplifier means,
   overload protection means for selectively inactivating said amplifier means when said output means approaches overload conditions,
   common reference means connected to each of the enumerated means to prevent spurious signals from being detected,
   said overload protection means comprising load cell means,
   power supply means connected to said load cell means,
   second amplifier means having first and second input terminals,
   said load cell means being connected to said first input terminal of said second amplifier means,
   feedback means connected between the output of said second amplifier means and said second input terminals,
   first switch means connected to said output of said second amplifier means and selectively rendered conductive in accordance with the magnitude of the signal produced by said second amplifier means, second switch means connected to said first switch means and selectively rendered conductive in accordance with the magnitude of the signal produced by said first switch means, and further output means selectively connected to said first and second switch means.

3. The control system recited in claim 2 wherein:

said first and second switch means comprise transistor means, and source means connected to said transitor means and said second amplifier means.

4. The control system recited in claim 2 including:

unilaterally conductive means connected between each of said switch means and said further output means.

5. The control system recited in claim 2 including:

indicating means connected to said load cell means to indicate the status and condition of the signal produced thereby.

6. The control system recited in claim 2 including:

means connected to said load cell to selectively adjust the reference signal level supplied thereto.

7. In combination:

load cell means, power supply means connected to said load cell means, amplifier means having first and second input terminals, said load cell means being connected to said first input terminal of said amplifier means, feedback means connected between the output of said amplifier means and said second input terminal, first switch means connected to said output of said amplifier means and selectively rendered conductive in accordance with the magnitude of the signal produced by said amplifier means, second switch means connected to said first switch means and selectively rendered conductive in accordance with the magnitude of the signal produced by said first switch means, and output means selectively connected to said first and second switch means.

8. The combination recited in claim 6 wherein:

said first and second switch means comprise transistor means, and source means connected to said transistor means and said amplifier means.